US012404097B2

(12) United States Patent
Chupinski

(10) Patent No.: US 12,404,097 B2
(45) Date of Patent: Sep. 2, 2025

(54) COLLAPSIBLE YARD REFUSE BAG STAND

(71) Applicant: Timothy Chupinski, Marlborough, MA (US)

(72) Inventor: Timothy Chupinski, Marlborough, MA (US)

( * ) Notice: Subject to any disclaimer, the term of this patent is extended or adjusted under 35 U.S.C. 154(b) by 904 days.

(21) Appl. No.: 17/576,534

(22) Filed: Jan. 14, 2022

(65) Prior Publication Data

US 2022/0234820 A1 Jul. 28, 2022

Related U.S. Application Data

(60) Provisional application No. 63/141,246, filed on Jan. 25, 2021.

(51) Int. Cl.
*B65F 1/14* (2006.01)

(52) U.S. Cl.
CPC .................................. *B65F 1/1415* (2013.01)

(58) Field of Classification Search
CPC ............... B65F 1/1415; B65B 67/1205; B65B 67/1238
USPC .......................................................... 294/214
See application file for complete search history.

(56) References Cited

U.S. PATENT DOCUMENTS

| | | | | | |
|---|---|---|---|---|---|
| 3,387,134 | A * | 6/1968 | Treharne | G01J 5/20 | 338/18 |
| 3,410,328 | A * | 11/1968 | Sasai | B65D 7/26 | 5/98.1 |
| 4,273,167 | A * | 6/1981 | Stillwell | B65B 67/12 | 141/391 |
| 5,671,858 | A * | 9/1997 | Hsu | B65D 11/18 | 220/9.4 |
| 6,076,782 | A * | 6/2000 | Alderman | B65B 67/1205 | 248/97 |
| D447,845 | S * | 9/2001 | Neil | B65F 1/1415 | D34/6 |
| 6,315,143 | B1 * | 11/2001 | Dotts | B65F 1/1415 | 220/904 |
| 6,419,193 | B1 * | 7/2002 | Rodriquez | B62B 3/106 | 248/101 |
| 7,066,432 | B2 * | 6/2006 | Wood | B65F 1/1415 | 248/150 |
| 7,731,134 | B1 * | 6/2010 | Mutert | B65B 67/1205 | 248/97 |
| 8,479,780 | B2 * | 7/2013 | Fernandez | B65F 1/1468 | 141/10 |
| 11,547,206 | B2 * | 1/2023 | Choi | F16B 12/32 | |

* cited by examiner

*Primary Examiner* — Paul T Chin

(74) *Attorney, Agent, or Firm* — Morse, Barnes-Brown & Pendleton, P.C.; Sean D. Detweiler, Esq.

(57) ABSTRACT

An apparatus and method of use for a collapsible yard refuse bag stand. In a deployed configuration the collapsible refuse bag stand can hold one or more bags in an upright and open positions for the depositing of yard refuse in the one or more bags allowing for easier use of yard refuse bags by a single individual. The collapsible yard refuse bag stand can be collapsed for easier transportation and storage when not in use.

16 Claims, 9 Drawing Sheets

COLLAPSIBLE YARD REFUSE BAG STAND

CROSS-REFERENCE TO RELATED APPLICATION(S)

This application claims priority to, and the benefit of, U.S. Provisional Application 63/141,246, filed Jan. 25, 2021, for all subject matter common to both applications. The disclosure of said provisional application is hereby incorporated by reference in its entirety.

FIELD OF THE INVENTION

The present invention relates to the clean-up and storage of yard refuse. In particular, the present invention relates to a collapsible yard refuse bag stand suitable for maintaining yard refuse bags in an upright and operable position to receive yard refuse.

BACKGROUND

Generally, yard refuse, such as leaves, grass clippings, weeds, brush, or trimmings are collected and put into piles or transferred into containers for disposal or collection. Many municipalities have implemented the use and collection of yard refuse bags for this purpose. Such yard refuse bags are typically large paper bags designed to be filled with yard refuse for easier transportation, collection, and disposal/removal of the yard refuse.

However, the use of such yard refuse bags experiences some shortcomings. Filling such yard refuse bags is typically a two-person job with one person holding the bag in an open and upright operable position while the other person transfers collected yard refuse into the bag. Without someone holding the yard bag in an upright and open operable position, the yard refuse bags tend to close, collapse, or fall over while they are being filled.

SUMMARY

There is a need for a solution to keep yard refuse bags in an open and upright operable position while depositing yard refuse in the yard refuse bag such that the task can be performed by a single individual because a second individual is not required to hold the yard refuse bag in the open and upright operable position. The present invention is directed toward further solutions to address this need, in addition to having other desirable characteristics.

In accordance with an embodiment of the present invention, a collapsible yard refuse bag stand is provided. The collapsible yard refuse bag stand includes a frame and a feeder guide.

The frame has a collapsed configuration and a deployed configuration. The deployed configuration is configured, sized, and dimensioned to support one or more yard refuse bags in an upright and open position. The frame includes a plurality of legs and a collapsible truss. Each leg of the plurality of legs has an upper end and a lower end. The collapsible truss is connected to each of the legs. The collapsible truss includes at least four sides. Each side is formed of a scissor linkage.

The feeder guide is configured, sized, and dimensioned to fit over the truss in the deployed configuration. The feeder guide includes one or more chutes that are configured, sized, and dimensioned to extend downward from the frame on a same side of the frame as the plurality of legs. When the one or more yard refuse bags are placed in an upright position under the one or more chutes, each of the one or more chutes supports a yard refuse bag of the one or more yard refuse bags in an upright and open position in such a way that any yard refuse placed through the feeder guide is directed via gravitational force through the one or more chutes into one of the one or more yard refuse bags.

In accordance with an aspect of the present invention, one of the chutes that extends downward extend into one of the yard refuse bags serves as a guide holding the yard refuse bag in place aligned under the chute.

In accordance with an aspect of the present invention, the lower ends of the plurality of legs further include adjustable extensions enabling adjustment of a length of the plurality of legs.

In accordance with an aspect of the present invention, the feeder guide is formed of fabric. In some such aspects, the fabric comprises reinforced canvas.

In accordance with an aspect of the present invention, the frame is generally formed of aluminum.

In accordance with an aspect of the present invention, the one or more chutes are each 20.5 inches long in the downward direction.

In accordance with an aspect of the present invention, the one or more chutes comprise two chutes. In some aspects, the one or more chutes comprise four chutes.

In accordance with an aspect of the present invention, each of the one or more chutes is sized and dimensioned to receive and support a conventional thirty (30) gallon yard refuse bag.

In accordance with an aspect of the present invention, one or more chutes further includes one or more securing means for securing the one or more yard refuse bags in an upright position under the one or more chutes.

In accordance with an aspect of the present invention, each scissor linkage of the truss includes a first link, a second link, a third link, and a fourth link. The first link has a first end and a second end. The first end of the first link is pivotably coupled to an upper end of a leg of the plurality of legs. The second link also has a first end and a second end. The first end of the second link is slidably coupled to the leg of the plurality of legs to which the first link is pivotably coupled. The first link and second link are pivotably coupled together in a scissor configuration. The third link has a first end and a second end. The first end of the third link is pivotably coupled to an upper end of an adjacent leg of the plurality of legs and the second end of the third link is pivotably coupled to the second end of the first link. The fourth link also has a first end and a second end. The first end of the fourth link is slidably coupled to the adjacent leg of the plurality of legs to which the third link is pivotably coupled and the second end of the fourth link is pivotably linked to the second end of the second link. The third link and fourth link are pivotably coupled together in a scissor configuration. The scissor configuration of the first link and second link and the scissor configuration of the third link and the fourth link operate in conjunction with the pivotable coupling of the first link to the third link and the pivotable coupling of the second link to the fourth link so as to transition from a collapsed configuration to a deployed configuration.

In accordance with an embodiment of the present invention, a method of collecting yard refuse is provided. The method involves deploying a deploying a collapsible yard refuse bag stand as set forth herein, providing one or more yard refuse bags in an upright and open position within the deployed collapsible yard refuse bag stand, and placing collected yard refuse through the feeder guide of the deployed collapsible yard refuse bag stand. The yard refuse falls via gravitational force through the one or more chutes into the one of the one or more yard refuse bags supported in an upright and open position by the frame.

In accordance with an aspect of the present invention, the collapsible yard refuse bag stand further includes one or more securing means on the one or more chutes for securing one or more yard refuse bags in an upright position under the one or more chutes.

In accordance with an aspect of the present invention, the method further involves removing the one or more yard refuse bags from the collapsible yard refuse bag stand when the one or more yard refuse bags are full. In some such aspects, the method further involves collapsing the collapsible yard refuse bag stand retracting the scissor linkage of each side of the collapsible truss, and retracting the plurality of legs.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
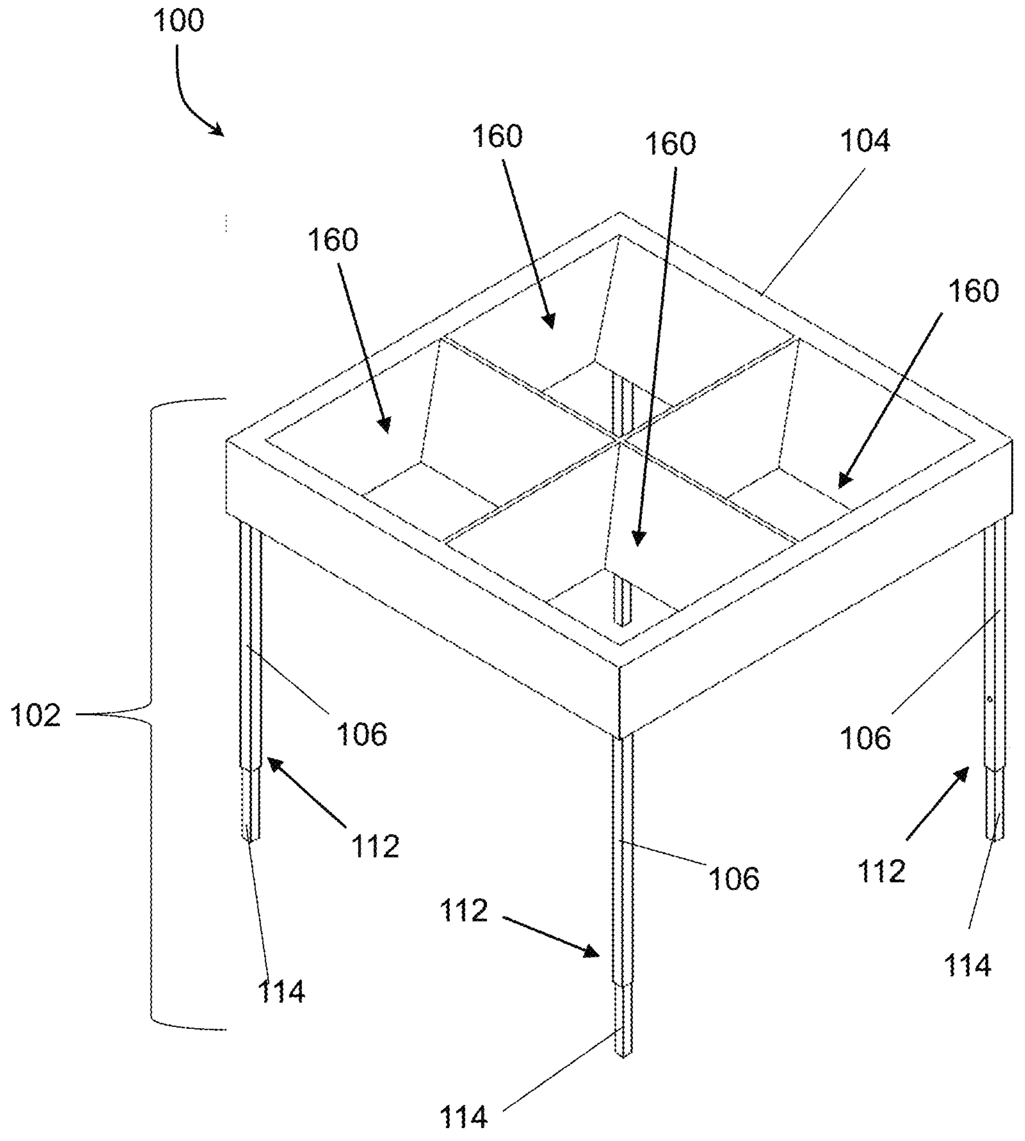
FIG. 1 is an isometric view of a collapsible yard refuse bag stand in a deployed configuration in accordance with an embodiment of the present invention.

An illustrative embodiment of the present invention relates to a collapsible yard refuse bag stand for use with one or more yard refuse bags. In a deployed configuration the collapsible yard refuse bag stand can hold one or more yard refuse bags in an open and upright operable position suitable for the depositing of yard refuse into the one or more yard refuse bags, thereby allowing for easier management or handling of yard refuse bags by an individual. The collapsible yard refuse bag stand can be collapsed for easier transportation and storage when not in use.

FIGS. 1 through 9, wherein like parts are designated by like reference numerals throughout, illustrate an example embodiment or embodiments of a collapsible refuse bag stand and method of use, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
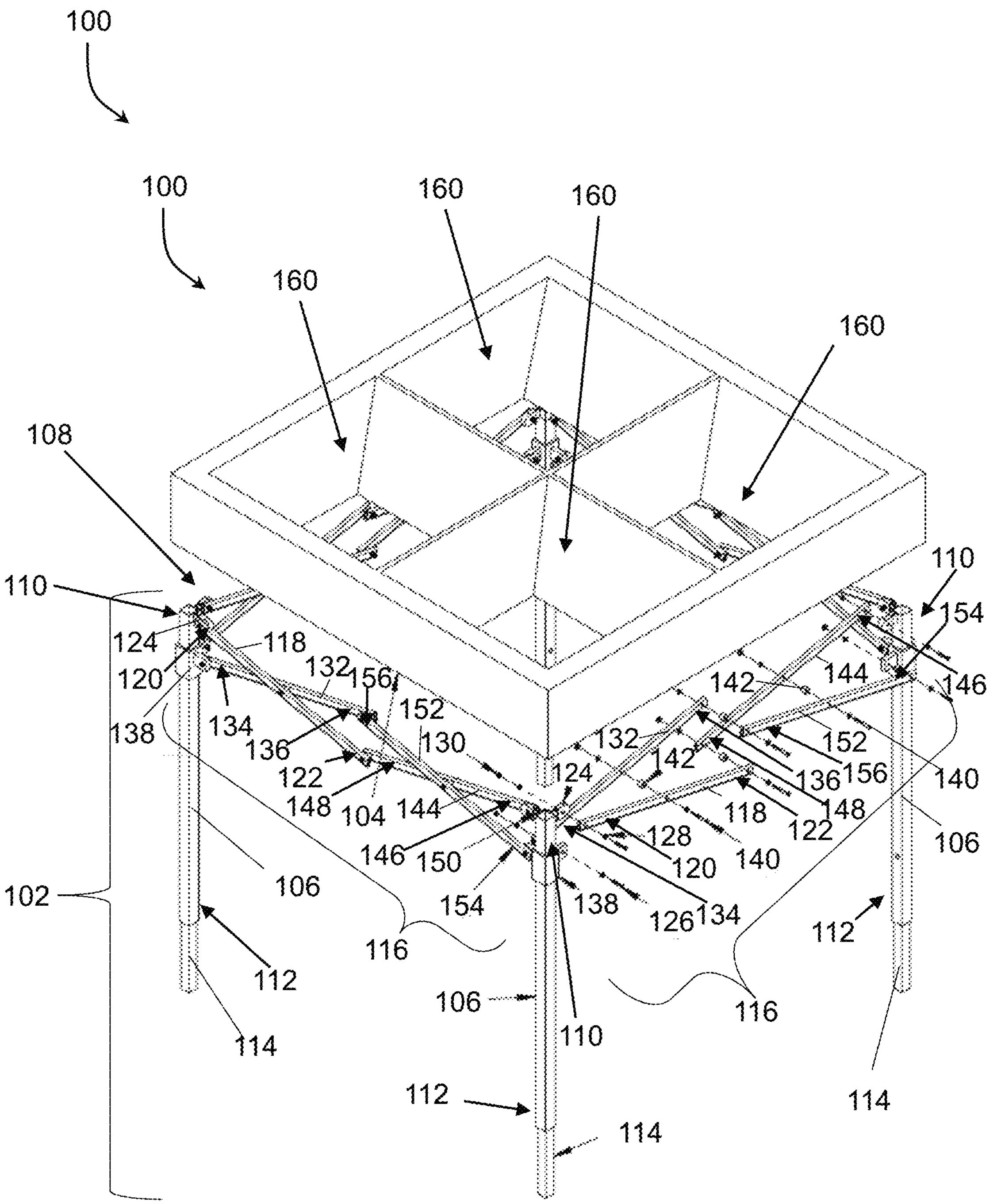
FIG. 2 is an exploded isometric view of the collapsible yard refuse bag stand in a deployed configuration.

FIG. 1 depicts an embodiment of collapsible yard refuse bag stand 100 in a deployed configuration. FIG. 2 shows an exploded view of a deployed collapsible yard refuse bag stand 100 in accordance with an embodiment. The collapsible yard refuse bag stand 100 comprises a frame 102 and a feeder guide 104.

Figure 3:
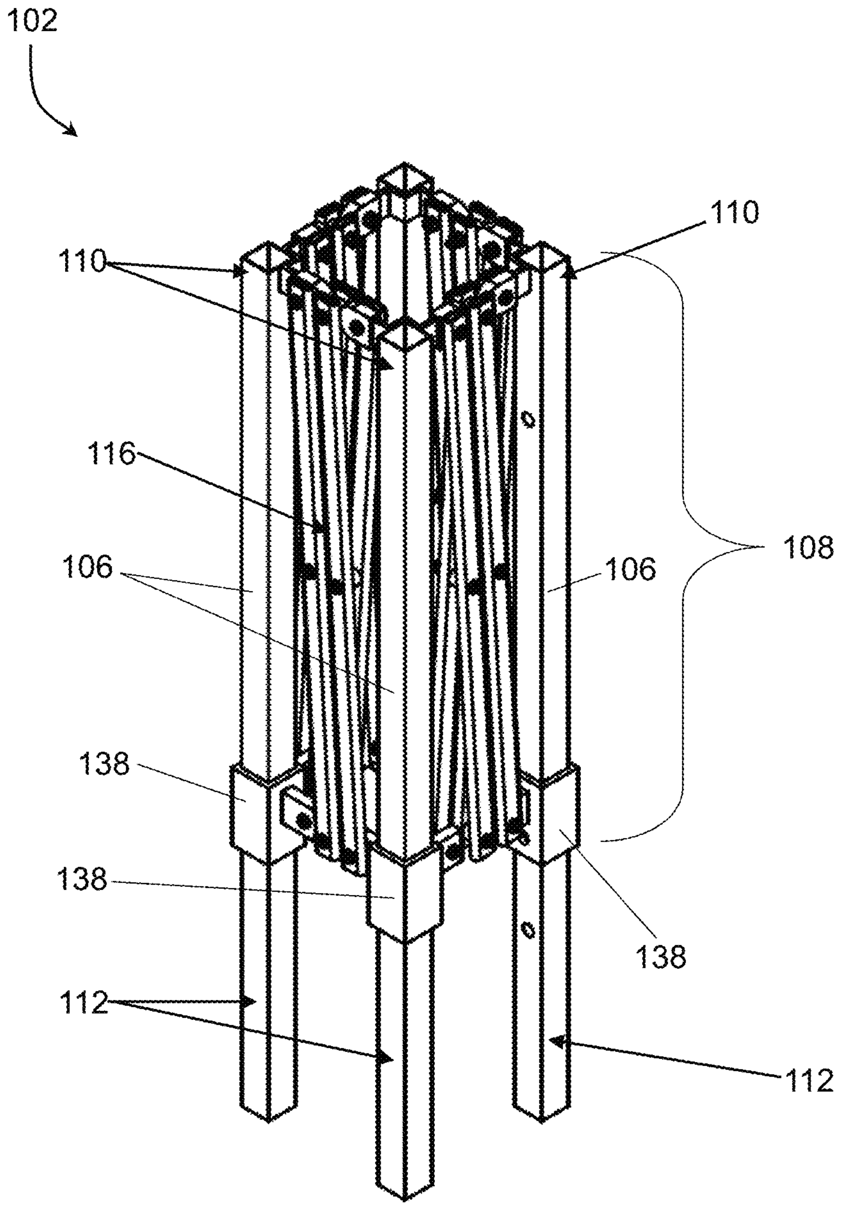
FIG. 3 is an isometric view of a frame of the collapsible yard refuse bag stand in a collapsed configuration.
Figure 4:
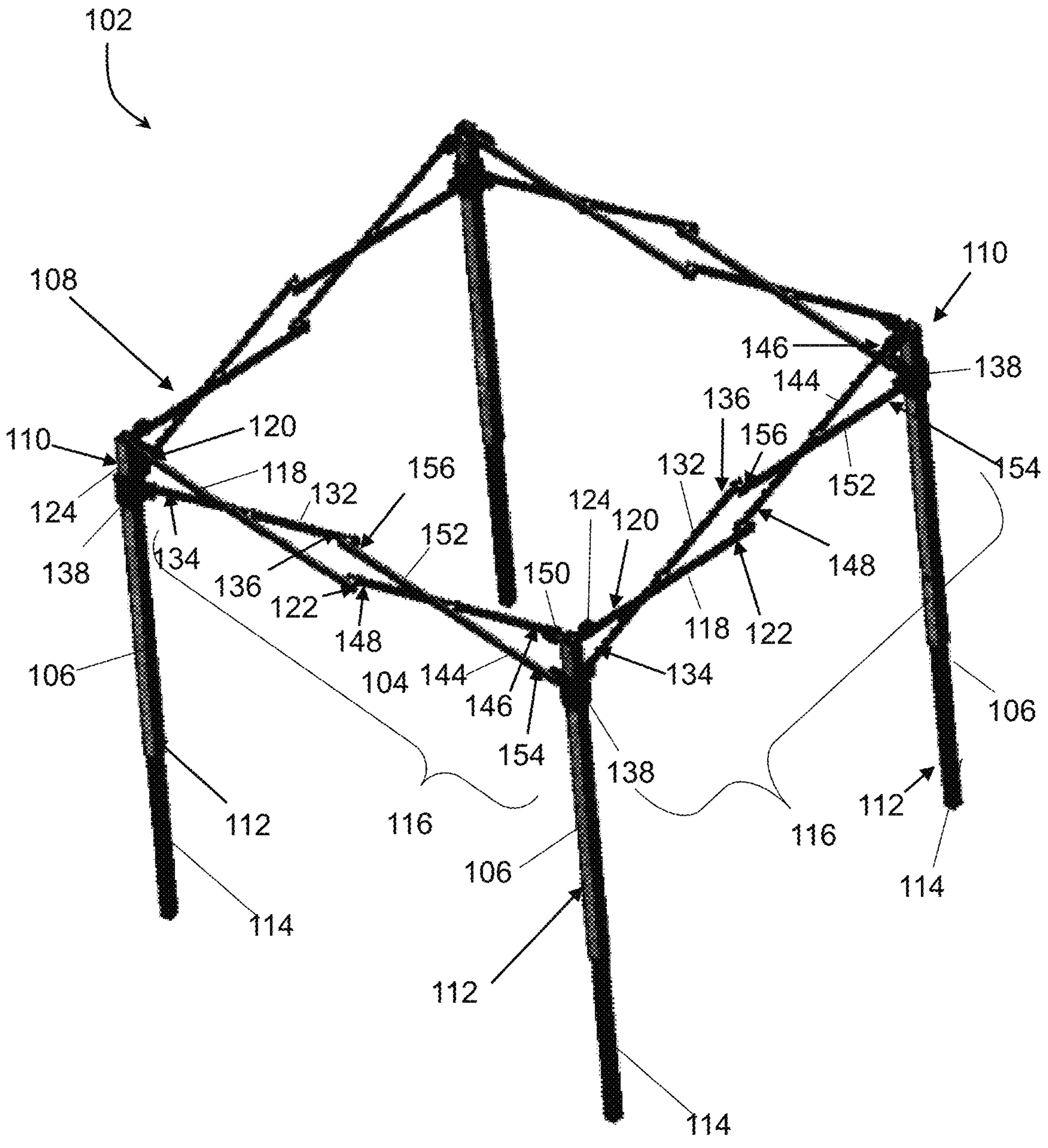
FIG. 4 is an isometric view of the frame of the collapsible yard refuse bag stand in a deployed configuration.

The frame 102 has a collapsed configuration as seen in FIG. 3 and a deployed configuration as seen in FIG. 4. In the deployed configuration, the frame 102 is configured, sized, and dimensioned to support one or more yard refuse bags in an open and upright operable position. The frame 102 includes a plurality of legs 106 and a collapsible truss 108. In certain embodiments, the frame 102 or its components, are formed of metal, such as aluminum. Other possible materials will be apparent to one skilled in the art given the benefit of this disclosure.

Each leg 106 has an upper end 110 and a lower end 112. In some embodiments, the lower ends 112 of the plurality of legs 106 further comprise adjustable extensions 114 enabling adjustment of a length of the plurality of legs 106 and a resulting height of the collapsible yard refuse bag stand 100.

The collapsible truss 108 is connected to each of the legs 106, with the collapsible truss 108 comprising at least four sides. Each side of the collapsible truss 108 is formed of a scissor linkage 116. In certain embodiments, each scissor linkage 116 of the truss 108 comprises a series of links coupled together. Other possible configurations will be apparent to one skilled in the art given the benefit of this disclosure.

In the embodiment depicted, a first link 118 has a first end 120 and a second end 122. The first end 120 is pivotably coupled to an upper end 110 of a leg 106 of the plurality of legs. In certain embodiments, the first end 120 is pivotably coupled to the upper end 110 via a hinge 124 where the first link 118 pivots around a pin, in this case a bolt 126 having washers 128 secured with a locknut 130. Other suitable couplings will be apparent to one skilled in the art given the benefit of this disclosure.

A second link 132 has a first end 134 and a second end 136. The first end 134 is slidably coupled to the leg 106 of the plurality of legs to which the first link 118 is pivotably coupled. In certain embodiments, the first end 134 is pivotably coupled to a sliding hinge assembly 138 where the sliding hinge assembly 138 is configured to slide along the length of the leg 106 from upper end 110 to the lower end 112 while the second link 132 pivots around a pin, in this case a bolt 126 with washers 128 secured by a locknut 130. Other suitable couplings will be apparent to one skilled in the art given the benefit of this disclosure.

The first link 118 and second link 132 are pivotably coupled together in a scissor configuration. In certain embodiments, such as depicted, the first link 118 and second link 132 are pivotably coupled by a pin, in this case a bolt 140 with washer 128 secured by a locknut 130 at around a midpoint of the first link 118 and second link 132 located between the first end 120 and the second end 122 for the first link 118 and between the first end 134 and the second end

136 of the second link 132. In some such embodiments, a washer or spacer 142 is provided between the first link 118 and second link 132 at the coupling. Other suitable couplings will be apparent to one skilled in the art given the benefit of this disclosure.

The third link 144 has a first end 146 and a second end 148, wherein the first end 146 is pivotably coupled to an upper end 110 of an adjacent leg 106 of the plurality of legs and the second end 148 is pivotably coupled to the second end 122 of the first link 118. In certain embodiments, the first end 146 is pivotably coupled to the upper end 110 via a hinge 150 where the first link 118 pivots around a pin, in this case a bolt 126 having washers 128 secured with a locknut 130. In certain embodiments, the second end 122 of the first link 118 and the second end 148 of the third link 144 are pivotably coupled by a pin, in this case bolt 140 with washer 128 secured by a locknut 130. In some such embodiments, a spacer 142 is provided between the first link 118 and third link 144 at the coupling. Other suitable couplings will be apparent to one skilled in the art given the benefit of this disclosure.

The fourth link 152 has a first end 154 and a second end 156, wherein the first end 154 is slidably coupled to the adjacent leg 106 of the plurality of legs to which the third link 144 is pivotably coupled and the second end 156 is pivotably linked to the second end 136 of the second link 132. In certain embodiments, the first end 134 is pivotably coupled to a sliding hinge assembly 138 where the sliding hinge assembly 138 is configured to slide along the length of the leg 106 from upper end 110 to the lower end 112 while the fourth link 152 pivots around a pin, in this case a bolt 126 with washers 128 secured by a locknut 130. In certain embodiments, the second end 136 of the second link 132 and the second end 156 of the fourth link 152 are pivotably coupled by a pin, in this case a bolt 140 with washer 128 secured by a locknut 130. In some such embodiments, a spacer 142 is provided between the second link 132 and fourth link 152 at the coupling. Other suitable couplings will be apparent to one skilled in the art given the benefit of this disclosure.

The third link 144 and fourth link 152 are pivotably coupled together in a scissor configuration. In certain embodiments, such as depicted, the third link 144 and fourth link 152 are pivotably coupled by a pin, in this case bolt 140 with washer 128 secured by a locknut 130 at around a midpoint of the third link 144 and fourth link 152 located between the first end 146 and the second end 148 for the third link 144 and between the first end 154 and the second end 156 of the fourth link 152. In some such embodiments, a washer or spacer 142 is provided between the first link 118 and second link 132 at the coupling. Other suitable couplings will be apparent to one skilled in the art given the benefit of this disclosure.

The scissor configuration of the first link 118 and second link 132 and the scissor configuration of the third link 144 and the fourth link 152 work in conjunction with the pivotable coupling of the first link 118 to the third link 144 and the pivotable coupling of the second link 132 to the fourth link 152 so as to transition from a collapsed configuration to a deployed configuration.

FIG. 3 depicts the frame 102 in a collapsed configuration. As can be seen, as the legs 106 are moved together, the individual links of the scissor linkage 116 on each side of the collapsible truss 108 move in relation to each other with the sliding hinge assembly 138 on each leg 106 sliding from the upper end 110 to the lower end 112 allowing the truss 108 to collapse. In certain embodiments, the adjustable extensions 114 are retracted into the legs 106 in the collapsed configuration.

FIG. 4 depicts the frame 102 in a deployed configuration. As can be seen, as the legs 106 are moved apart the individual links of the scissor linkage 116 on each side of the collapsible truss 108 move in relation to each other with the sliding hinge assembly 138 on each leg 106 sliding from the lower end 112 to the upper end 110 allowing the truss 108 to expand. In certain embodiments, the adjustable extensions 114 are extended from the legs 106 in the deployed configuration.

Figure 5:
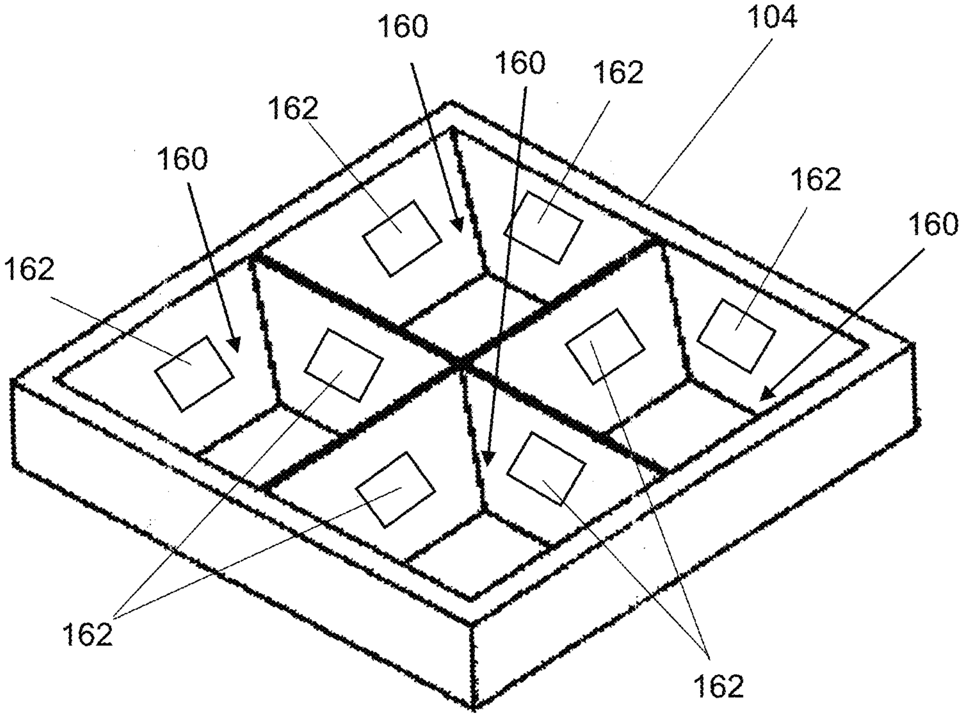
FIG. 5 depicts an isometric view and a front view of a feeder guide of the collapsible yard refuse bag stand.
Figure 5:
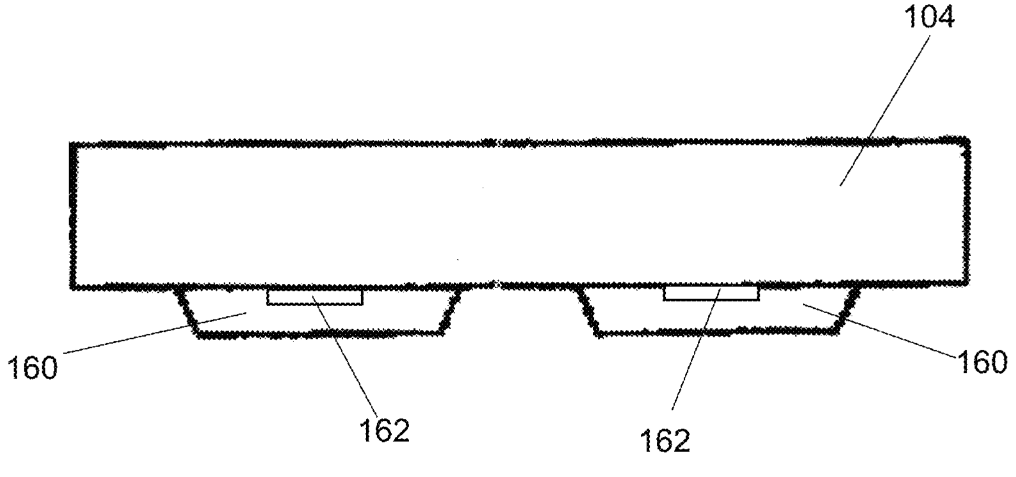

FIG. 5 depicts various views of the feeder guide 104 as seen in FIG. 1 and FIG. 2 in isolation. The feeder guide 104 and is configured, sized, and dimensioned to fit over the truss 108 in the deployed configuration as seen in FIG. 4. In certain embodiments, the feeder guide 104 is formed of fabric. In some such embodiments, the feeder guide 104 is formed of reinforced canvas.

The feeder guide 104 includes one or more chutes 160. The one or more chutes 160 are configured, sized, and dimensioned to extend downward from the frame 102 on a same side of the frame 102 as the plurality of legs 106. There can be any number of chutes 160. In some embodiments, there are two chutes of the one or more chutes 160. In other embodiments, there are four chutes of the one or more chutes 160. In certain embodiments, one of the chutes 160 that extends downward extends into a yard refuse bag and serves as a guide holding the yard refuse bag in place aligned under each of the one or more chutes 160. In some embodiments, the one or more chutes 160 further include one or more securing means 162 such as tabs, clips, or other securing means. The securing means 162 serve to secure a yard refuse bag in place around a chute 160 in an upright position. In some such embodiments, the securing means 162 can be used to secure lawn refuse bags that would ordinarily not be able to stand in open upright position around the chute 160. For example, a conventional plastic trash bag could be used as a yard refuse back with the securing means 162 holding the trash back in place around the chute 160.

In some embodiments, the one or more chutes 160 are each 20.5 inches long in the downward direction. In some such embodiments, each of the one or more chutes 160 is sized and dimensioned to receive and support a conventional thirty (30) gallon paper yard refuse bag. In embodiments with securing means 162, thirty (30) gallon trash bags could also be used. Overall dimensions of the various components of the collapsible yard refuse bag stand 100 described herein are appropriately sized and dimensioned to correspond to supporting four conventional thirty (30) gallon yard refuse bags as depicted and as would be readily understood by those of skill in the art, such that additional dimensional ranges are not necessary for this disclosure.

When one or more yard refuse bags 164 are placed in an upright position under the one or more chutes 160, each of the one or more chutes 160 supports one yard refuse bag of the one or more yard refuse bags 164 in an upright and open position in such a way that any yard refuse placed through the feeder guide 104 is directed via gravitational force through the one or more chutes 160 into one of the one or more yard refuse bags 164. In embodiments having securing means 162, the securing means 162 can further be used to secure the one or more yard refuse bags 164 in an upright and open position around the chute 160.

Figure 6:
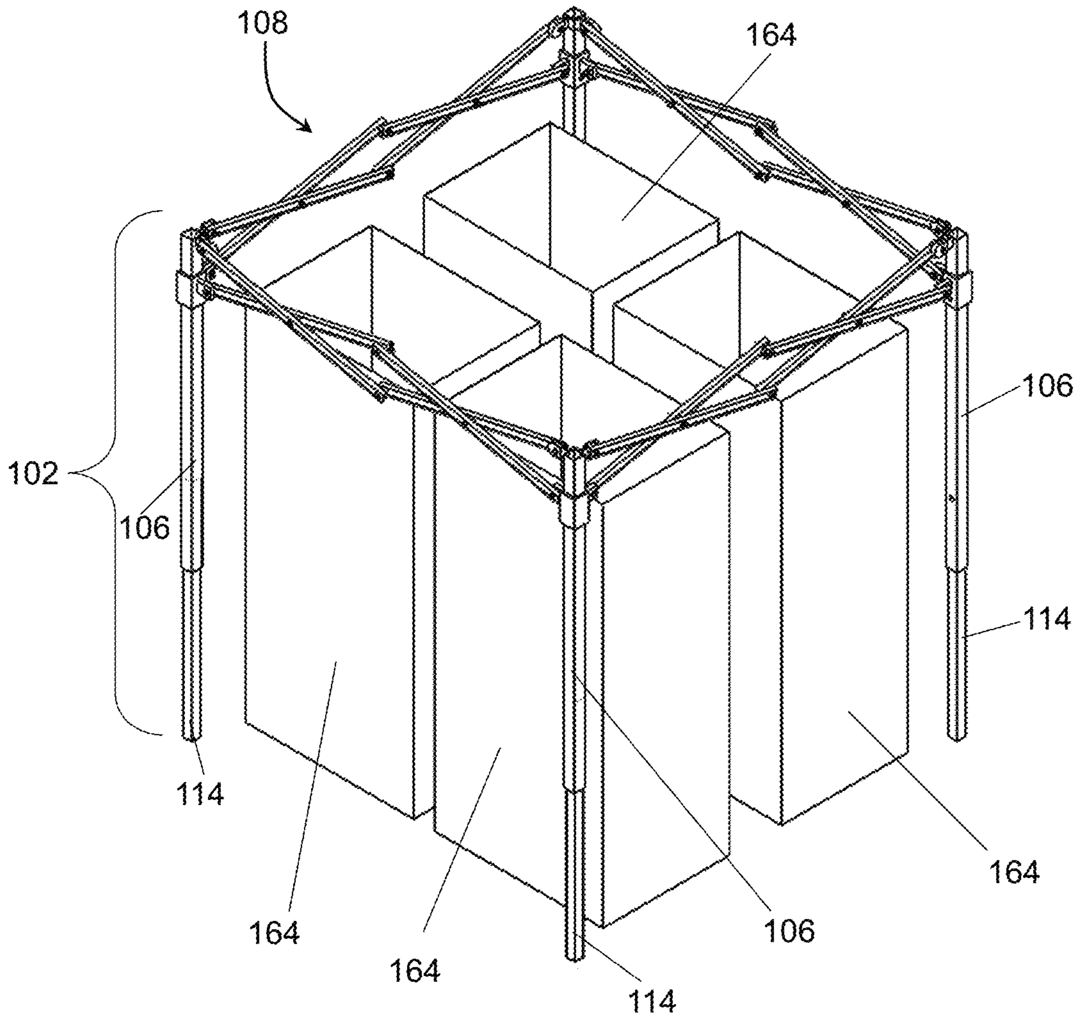
FIG. 6 depicts the frame of the collapsible yard refuse bag stand in a deployed configuration holding yard refuse bags in an open and upright operable position in accordance with aspects of the present invention.

FIG. 6 depicts an example embodiment where multiple yard refuse bags 164 are deployed within a deployed frame 102 of the bag stand 100. In this embodiment, four of the one or more yard refuse bags 164, in this case conventional paper yard refuse bags, are in an upright and open position within the frame 102. It should be understood that the stand can be configured, sized, and dimensioned to accommodate any number of bags 164.

Figure 7:
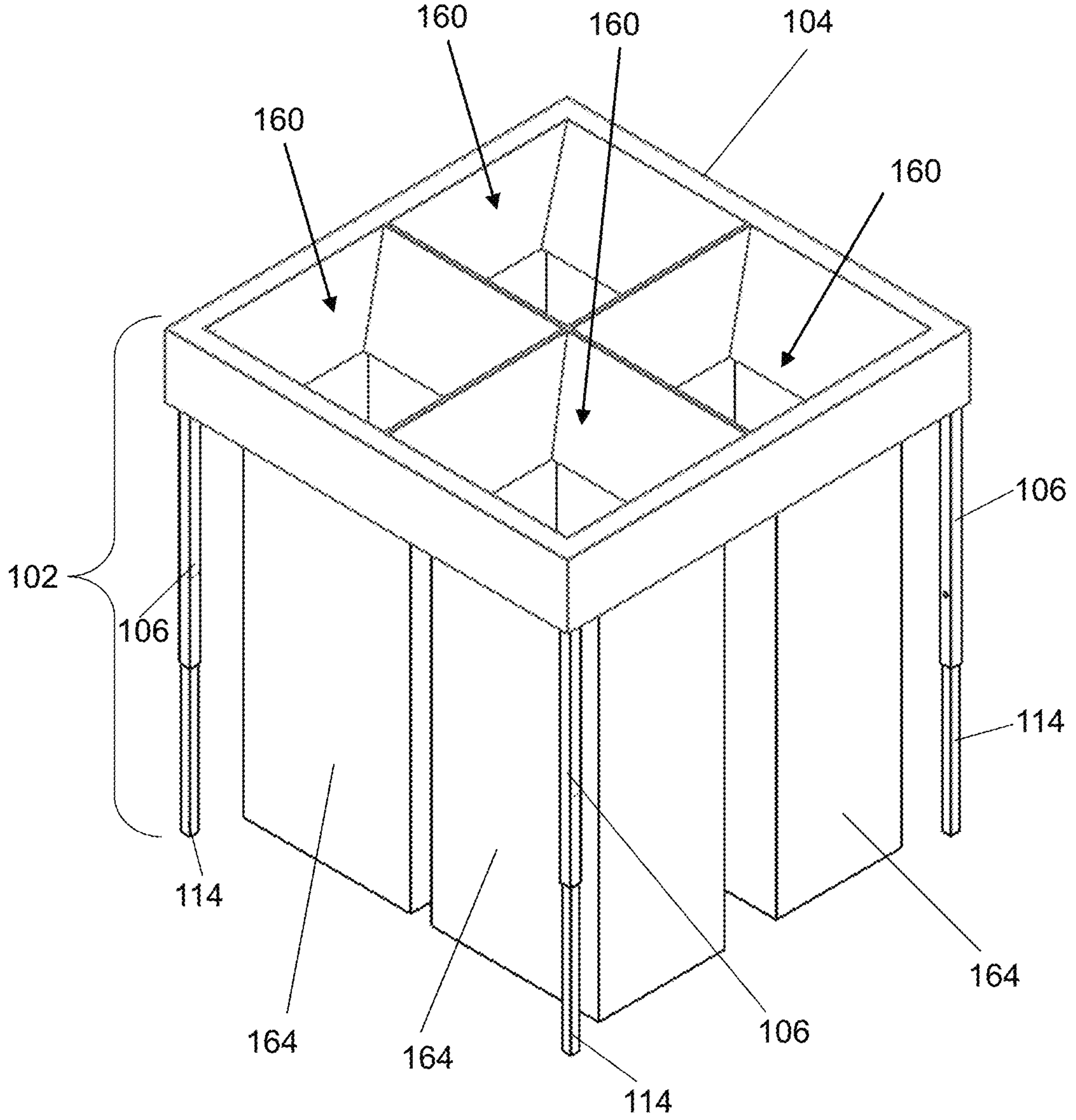
FIG. 7 depicts the collapsible yard refuse bag stand in a deployed configuration holding yard refuse bags in an open and upright operable position.
Figure 8:
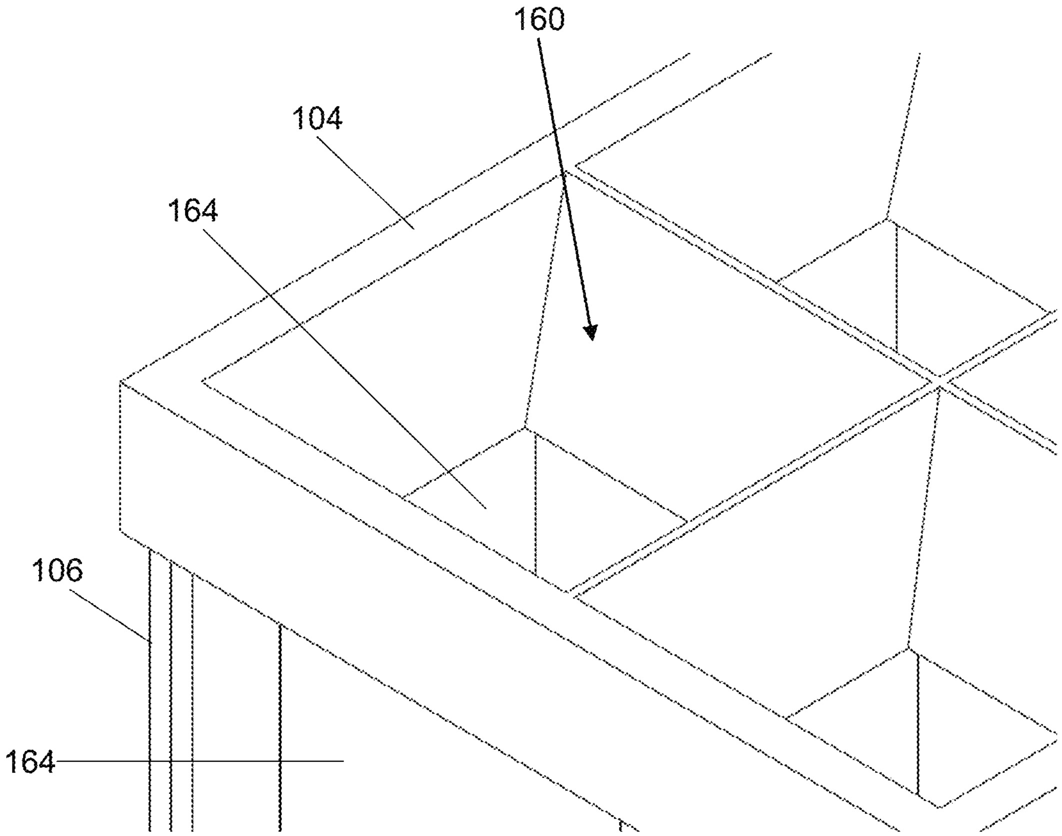
FIG. 8 is a close-up view of a chute of a feeder guide of the collapsible yard refuse bag stand in a deployed configuration holding yard refuse bags in the open and upright operable position.

FIG. 7 depicts the deployed frame 102 and the one or more yard refuse bags 164 of FIG. 6 where the feeder guide 104 has been fitted over the truss 108 framework of the frame 102 structure with the chutes 160 of the feeder guide 104 extending down into each of the one or more yard refuse bags 164 supporting the yard refuse bags in an upright and open position. A close-up view of the chute 160 extending into a yard refuse bag 164 of the one or more yard refuse bags 164 can be seen in FIG. 8.

Figure 9:
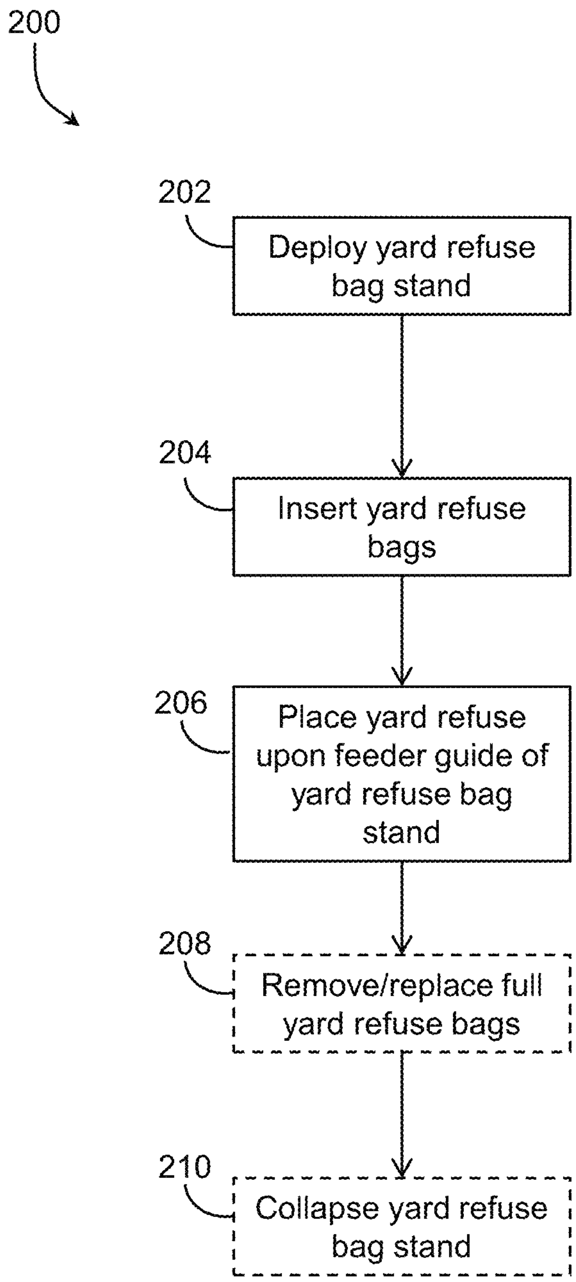
FIG. 9 depicts a flow diagram of a methodology of collecting yard refuse using a collapsible yard refuse bag stand in accordance with an embodiment of the present invention.

FIG. 9 is a flow diagram 200 of a methodology for collecting yard refuse using the collapsible yard refuse bag stand 100 of the present invention in accordance with embodiments of the present invention. The first step is deploying the yard refuse bag stand (Step 202). The yard refuse bag stand 100 can be seen in various stages of deployment in FIG. 1, FIG. 3, and FIG. 4. Next, the one or more yard refuse bags 164 are inserted into the stand 100 (Step 204). Examples of this can be seen in FIGS. 6-8. In embodiments having one or more securing means 162 on the one or more chutes 160, the one or more securing means 162 can be used to secure the one or more yard refuse bags 164 in an upright and open position. Once the one or more yard refuse bags 164 are installed (and optionally secured using securing means 162), yard refuse can be placed upon the feeder guide 104 of the stand 100 wherein yard refuse placed onto and through the feeder guide 104 is directed via gravitational force through the one or more chutes 160 into one of the one or more yard refuse bags 164 (Step 206). In certain embodiments, when one of the one or more yard refuse bags 164 is full, the bag can be removed and/or replaced with a new yard refuse bag 164 (Step 208). In some embodiments, when a user is finished using the yard refuse bag stand 100, the stand 100 can be collapsed for transportation and storage (Step 210).

The present invention provided a collapsible yard refuse bag stand 100 that is easy to deploy or collapse. In a deployed configuration the collapsible yard refuse bag stand 100 can hold one or more bags in an upright and open positions for the depositing of yard refuse in the one or more bags allowing for easier use of yard refuse bags by a single individual. The collapsible yard refuse bag stand can be collapsed for easier transportation and storage when not in use.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near-complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A collapsible yard refuse bag stand comprising:

a frame having a collapsed configuration and a deployed configuration, wherein the deployed configuration is configured, sized and dimensioned to support one or more yard refuse bags in an upright and open position, the frame comprising:

a plurality of legs, each leg having an upper end and a lower end; and a collapsible truss connected to each of the legs, the collapsible truss comprising at least four sides, each side formed of a scissor linkage; and a feeder guide configured, sized, and dimensioned to fit over the truss in the deployed configuration, the feeder guide comprising one or more chutes configured, sized, and dimensioned to extend downward from the frame on a same side of the frame as the plurality of legs;

wherein when the one or more yard refuse bags are placed in an upright position under the one or more chutes, each of the one or more chutes supports a yard refuse bag of the one or more yard refuse bags in an upright and open position in such a way that any yard refuse placed through the feeder guide is directed via gravitational force through the one or more chutes into one of the one or more yard refuse bags.

2. The collapsible yard refuse bag stand of claim 1, wherein one of the chutes that extend downward extend into one of the yard refuse bags serves as a guide holding the one yard refuse bag in place aligned under the one of the chutes.

3. The collapsible yard refuse bag stand of claim 1, wherein the lower ends of the plurality of legs further comprise adjustable extensions enabling adjustment of a length of the plurality of legs.

4. The collapsible yard refuse bag stand of claim 1, wherein the feeder guide is formed of fabric.

5. The collapsible yard refuse bag stand of claim 4, wherein the fabric comprises reinforced canvas.

6. The collapsible yard refuse bag stand of claim 1, wherein the frame is generally formed of aluminum.

7. The collapsible yard refuse bag stand of claim 1, wherein the one or more chutes are each 20.5 inches long in the downward direction.

8. The collapsible yard refuse bag stand of claim 1, wherein the one or more chutes comprise two chutes.

9. The collapsible yard refuse bag stand of claim 1, wherein the one or more chutes comprise four chutes.

10. The collapsible yard refuse bag stand of claim 1, wherein each of the one or more chutes is sized and dimensioned to receive and support a conventional 30 gallon yard refuse bag.

11. The collapsible yard refuse bag stand of claim 1, wherein one or more chutes further comprises one or more securing means for securing the one or more yard refuse bags in an upright position under the one or more chutes.

12. The collapsible yard refuse bag stand of claim 1, wherein each scissor linkage of the truss comprises:

a first link having a first end and second end, wherein the first end is pivotably coupled to an upper end of a leg of the plurality of legs; and a second link having a first end and second end, wherein the first end is slidably coupled to the leg of the plurality of legs to which the first link is pivotably coupled;

wherein the first link and second link are pivotably coupled together in a scissor configuration;

a third link having a first end and second end, wherein the first end is pivotably coupled to an upper end of an adjacent leg of the plurality of legs and the second end is pivotably coupled to the second end of the first link; and a fourth link having a first end and second end, wherein the first end is slidably coupled to the adjacent leg of the plurality of legs to which the third link is pivotably coupled and the second end is pivotably linked to the second end of the second link;

wherein the third link and fourth link are pivotably coupled together in a scissor configuration;

wherein the scissor configuration of the first link and second link and the scissor configuration of the third link and the fourth link operate in conjunction with the pivotable coupling of the first link to the third link and the pivotable coupling of the second link to the fourth link so as to transition from a collapsed configuration to a deployed configuration.

13. A method of collecting yard refuse comprising:

deploying a collapsible yard refuse bag stand; the collapsible yard refuse bag stand comprising:

a frame having a collapsed configuration and a deployed configuration, wherein the deployed configuration is configured, sized and dimensioned to support one or more yard refuse bags in an upright and open position, the frame comprising:

a plurality of legs, each leg having an upper end and a lower end;

a collapsible truss connected to each of the legs, the collapsible truss comprising at least four sides, each side formed of a scissor linkage;

a feeder guide configured, sized, and dimensioned to fit over the truss in the deployed configuration, the feeder guide comprising one or more chutes configured, sized, and dimensioned to extend downward from the frame on a same side of the frame as the plurality of legs;

wherein when the one or more yard refuse bags are placed in an upright position under the one or more chutes, each of the one or more chutes supports a yard refuse bag of the one or more yard refuse bags in an upright and open position in such a way that any yard refuse placed through the feeder guide is directed via gravitational force through one or more chutes into one of the one or more yard refuse bags;

providing the one or more yard refuse bags in and upright and open position within the deployed collapsible yard refuse bag stand; and placing collected yard refuse through the feeder guide of the deployed collapsible yard refuse bag stand, the yard refuse falling via gravitational force through the one or more chutes into the one of the one or more yard refuse bags supported in an upright and open position by the frame.

14. The method of claim 13, wherein the collapsible yard refuse bag stand further comprises one or more securing means on the one or more chutes for securing one or more yard refuse bag in an upright position under the one or more chutes.

15. The method of claim 13, further comprising:

removing the one or more yard refuse bags from the collapsible yard refuse bag stand when the one or more yard refuse bags are full.

16. The method of claim 15, further comprising:

collapsing the collapsible yard refuse bag stand retracting the scissor linkage of each side of the collapsible truss and retracting the plurality of legs.

* * * * *